United States Statutory Invention Registration [19]

[11] Reg. Number: H807

Klueh et al. [43] Published: Aug. 7, 1990

[54] MANGANESE-STABILIZED AUSTENITIC STAINLESS STEELS FOR FUSION APPLICATIONS

[75] Inventors: Ronald L. Klueh, Knoxville; Philip J. Maziasz, Oak Ridge, both of Tenn.

[73] Assignee: The United States of America as represented by the United States Department of Energy, Washington, D.C.

[21] Appl. No.: 272,035

[22] Filed: Nov. 16, 1988

[51] Int. Cl.[5] ..... C22C 38/38

[52] U.S. Cl. ..... 420/57; 420/68; 420/69; 420/74

[58] Field of Search ..... 148/327; 420/56, 57, 420/74

[56] References Cited

U.S. PATENT DOCUMENTS

| | | | |
|---|---|---|---|
| 4,493,733 | 1/1985 | Yamamoto et al. | 420/56 |
| 4,514,236 | 4/1985 | Cook et al. | 420/74 |
| 4,626,400 | 12/1986 | Jassby et al. | 376/146 |
| 4,720,435 | 1/1988 | Crook et al. | 420/51 |

FOREIGN PATENT DOCUMENTS

| | | | |
|---|---|---|---|
| 174418 | 3/1986 | European Pat. Off. | 420/57 |

OTHER PUBLICATIONS

R. H. Espy, "Weldability of Nitrogen-Strengthened Stainless Steels," May 1982, pp. 149-156.

H. Schneider, "Investment Casting of High-hot-strength 12-per-cent, Chrome Steel," May 5, 1960, pp. 562-563.

E. R. Szumachowski and D. J.Kotecki, "Effect of Manganese on Stainless Steel Weld Metal Ferrite," May 1984, pp. 156-161.

F. C. Hull, "Delta Ferrite and Martensite Formation in Stainless Steels," May 1973, pp. 193-203.

*Primary Examiner*—Matthew A. Thexton
*Assistant Examiner*—Joseph D. Anthony
*Attorney, Agent, or Firm*—Katherine Lovingood; Stephen D. Hamel; William R. Moser

[57] ABSTRACT

An austenitic stainless steel that is comprised of Fe, Cr, Mn, C but no Ni or Nb and minimum N. To enhance strength and fabricability minor alloying additions of Ti, W, V, B and P are made. The resulting alloy is one that can be used in fusion reactor environments because the half-lives of the elements are sufficiently short to allow for handling and disposal.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MANGANESE-STABILIZED AUSTENITIC STAINLESS STEELS FOR FUSION APPLICATIONS

This invention was developed pursuant to a contract with the U.S. Department of Energy.

This invention relates to austenitic stainless steels that are stabilized with manganese having the base composition Fe-10/18Cr-20/25Mn-0.1/0.3C and minor alloying additions of W, Ti, V, P and B added for strength. Unlike conventional stainless steels, they contain no Ni and minimum N, elements that when irradiated in a fusion reactor produce long-lived radioactive isotopes that are difficult to dispose of and dangerous to handle.

BACKGROUND

Austenitic Fe-Cr-Ni stainless steels are attractive candidates for first-wall and structural materials for magnetic fusion reactors. Steels like type 316 have good fabricability, strength, ductility and are commercially available; however, such steel compositions contain certain elements, such as nickel, molybdenum, copper, niobium and nitrogen, that when exposed to radiation form radioactive isotopes that have long half-lives. The result of operating a fusion reactor made of this type of steel would be the conversion of the steel into radioactive material that could not be serviced directly by humans nor be easily disposed of. To also serve as a good structural material despite their reduced reactivity, the materials must possess good unirradiated properties, particularly strength, as well as good resistance to adverse property changes during irradiation. Therefore, there is a need to develop structural materials for magnetic fusion reactors that either do not convert or minimally convert to radioactive isotopes of long half-life upon exposure to radiation.

SUMMARY OF THE INVENTION

In view of the above need, it is an object of this invention to provide structural materials for fusion reactor applications that do not convert to radioactive isotopes of long half-life upon exposure to radiation.

Another object of this invention is to provide an austenitic alloy that has no Ni or Nb and as little N as possible.

It is another object of this invention to provide steels that do not contain nitrogen, molybdenum, copper, niobium or nickel but that otherwise exhibit an austenite, face-centered-cubic crystal structure.

It is a further object of this invention to provide structural material for fusion reactors that are strong, ductile, inexpensive and easy to fabricate. Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the composition of matter of this invention may comprise a stainless steel of iron and chromium and a sufficient amount of manganese and carbon to form a face centered cubic austenitic crystalline structure. For strength and ductility the base alloy should include sufficient titanium in the presence of tungsten or vanadium or combinations thereof, to form small, uniform precipitates. A better alloy further includes minor additions of boron and phosphorous to support the strengthening effect of the precipitates. If the composition of matter is not to be used in a fusion reactor, the invention may also comprise small amounts of nickel and nitrogen. One advantage for non-fusion applications relative to commercial Fe-Cr-Ni structural steels is that less nickel, which is expensive and in short supply, is needed. Another is that nitrogen, which is difficult to exclude, is permitted. The alloys of this invention have the distinct advantage for fusion applications of being inexpensive, easy to maintain and safer to dispose of after exposure to a radiation environment than currently available related steels or alloys.

DETAILED DESCRIPTION OF THE PREFERRED EMBODIMENT

Radioactive decay values have been calculated for the various elements that generally comprise stainless steels. The radioactive decay behavior for steels can be classified into categories of low-activation materials and fast induced-radioactivity decay materials. The term "low-activation" ideally describes materials that would allow hands-on maintenance immediately after shutdown, and only materials like pure V or SiC can be classified as such. The term "fast induced-radioactivity decay" (FIRD) best describes engineering materials that would not allow hands-on maintenance, but could be disposed of by shallow land burial after reactor decommissioning. One approach to alloy design for fusion reactors is the substitution of standard steel alloying elements that produce long-lived radioactive isotopes with FIRD elements; however, development of an such a steel with an austenite structure, that is easily fabricable and has low- and high-temperature strength has been difficult.

Figure 1:
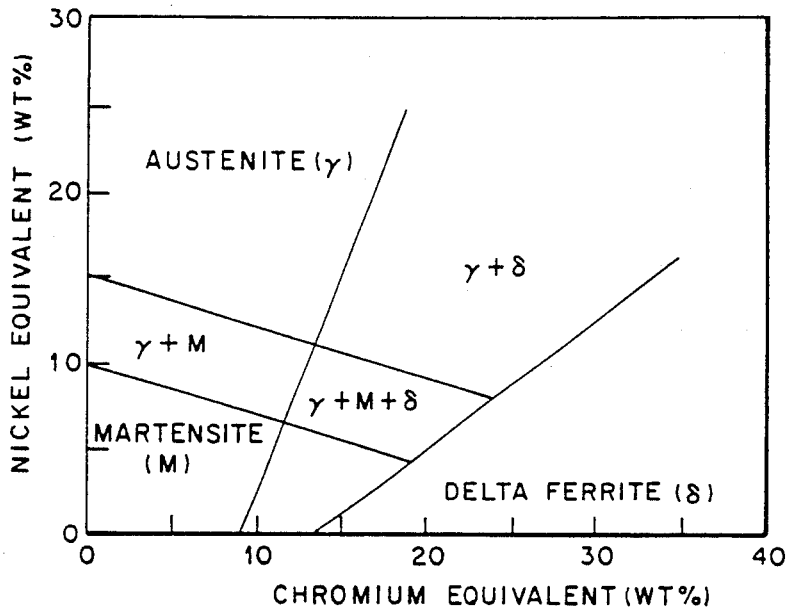
FIG. 1 is a modified Schaeffler diagram used to determine the compositions of Fe-Cr-Mn-C alloys having the austenitic phase structure.

The strategy for the development of FIRD alloys has been the replacement of elements like Mo, Nb and Ni in Fe-Cr-Ni-Mo steels such as type 316 with elements like Mn, W, Ti, V, Ta Si and C. The development of the alloys of this invention began with a base alloy having iron, chromium, manganese and carbon. The Mn and C, used in the place of Ni, give the alloy its face-centered cubic austenite structure. Studies done on a series of alloys set forth in Table 1 provided phase information that led to the development of a modified Schaeffler diagram, FIG. 1. The original Schaeffler diagram was developed for Fe-Cr-Ni alloys, and observations on the alloys of Table 1 indicated that this diagram did not predict the constituent phases of Fe-Cr-Mn-C alloys after annealing. As a result of the work on the alloys of Table 1, the new diagram (FIG. 1) was developed which does predict the appropriate ranges of elements for a stable austenitic alloy.

TABLE 1

| | Composition, wt % | | | | | | | | |
|---|---|---|---|---|---|---|---|---|---|
| Alloy | Mn | Cr | C | Ti | W | V | P | B | N |
| 0 | 13.4 | 15.0 | 0.069 | | | | | | 0.001 |
| 1 | 14.2 | 14.8 | 0.014 | | | | | | 0.001 |
| 2 | 17.1 | 15.2 | 0.056 | | | | | | 0.001 |
| 3 | 13.4 | 10.0 | 0.089 | | | | | | 0.002 |
| 4 | 18.9 | 9.9 | 0.093 | | | | | | 0.002 |
| 5 | 12.4 | 15.3 | 0.180 | | | | | | 0.002 |
| 6 | 14.3 | 16.0 | 0.180 | | | | | | 0.003 |
| 7* | 18.8 | 14.8 | 0.380 | | | | | | 0.005 |

TABLE 1-continued

| | Composition, wt % | | | | | | | | |
|---|---|---|---|---|---|---|---|---|---|
| Alloy | Mn | Cr | C | Ti | W | V | P | B | N |
| 8 | 17.7 | 20.1 | 0.130 | | | | | | 0.003 |
| 9 | 17.6 | 20.2 | 0.260 | | | | | | 0.006 |
| 10 | 19.9 | 10.0 | 0.081 | | | | | | 0.005 |
| 11 | 20.0 | 11.9 | 0.084 | | | | | | 0.009 |
| 12* | 20.1 | 12.0 | 0.180 | | | | | | 0.008 |
| 13 | 19.1 | 14.0 | 0.088 | | | | 0.003 | | 0.013 |
| 14 | 19.8 | 15.9 | 0.170 | | | | 0.003 | | 0.001 |

*entirely austenitic

Figure 3:
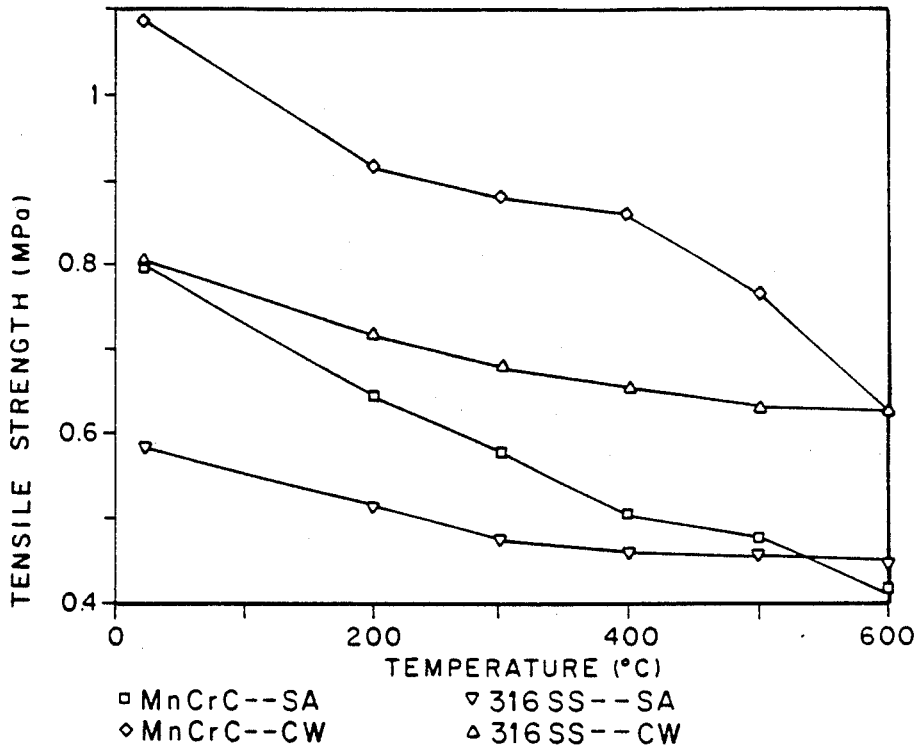
FIG. 3 is a diagram showing the ultimate tensile strength for a simple manganese-stabilized steel and type 316 stainless steel in both the solution-annealed and 20% cold-worked condition.
Figure 4:
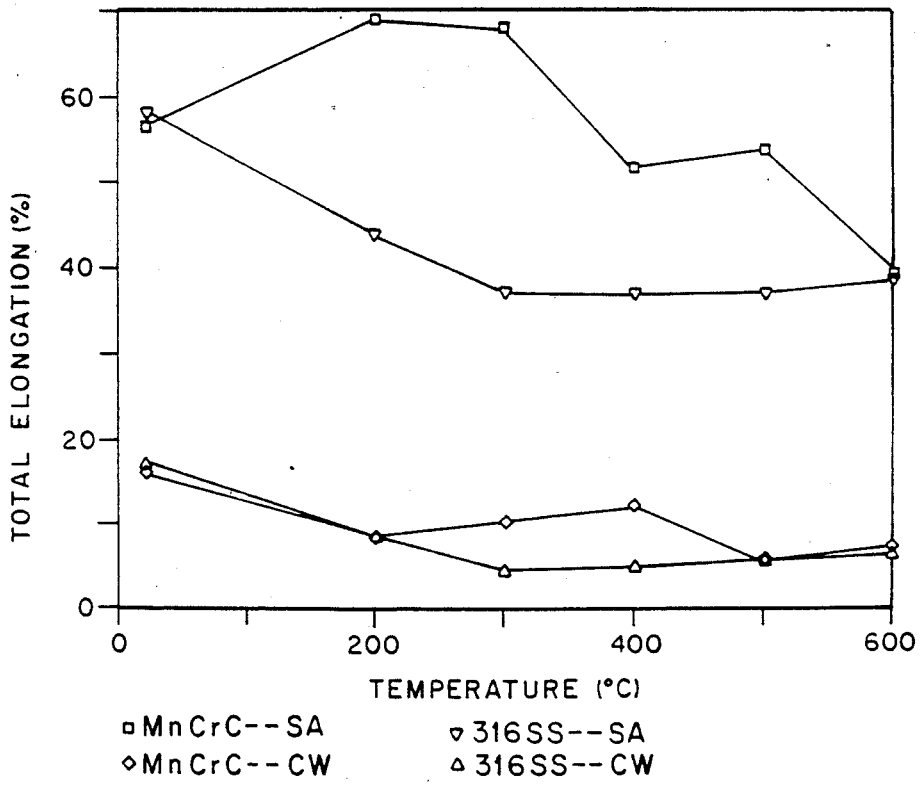
FIG. 4 is a diagram showing the ductility, as measured by total elongation, of simple manganese-stabilized steel and type 316 stainless steel in solution annealed and 20% cold-worked conditions.

One selected base alloy of Fe-20Mn-12Cr-0.25C had the desired structure with strength comparable to type 316 stainless steel as shown in FIGS. 3 and 4. The next step in development of the invention was an improvement in both strength and irradiation resistance. This required fine tuning the alloy composition with minor element additions and combinations to produce fine, stable MC precipitation without upsetting the austenite stability of the base alloy or degrading its properties. Alloys prepared in this study are set forth in Table 2. Titanium is one element that must be present for precipitate formation along with either tungsten or vanadium or a combination of the two. Although precipitate formation occurs when Ti and V additions are made, the necessary interaction between dislocations and the fine precipitate particles, which is the basis of high temperature strength, is not optimum. Alloying with boron and phosphorous resulted in their interaction with Ti and V or Ti, V, and W to cause the precipitates of TiC, WC and VC to be small and uniform and to interact with dislocations and grain boundaries so that precipitates could pin them, thus producing a metal that is strong at high temperatures.

TABLE 2

| | Composition, wt % | | | | | | | | |
|---|---|---|---|---|---|---|---|---|---|
| Alloy | Mn | Cr | C | Ti | W | V | P | B | N |
| 15 MnCrC | 20.5 | 11.8 | 0.240 | | | 0.01 | 0.004 | | 0.002 |
| 16 MnCrCTi | 20.5 | 11.7 | 0.250 | 0.11 | 0.09 | 0.01 | 0.003 | | 0.003 |
| 17 MnCrCW | 20.5 | 11.8 | 0.230 | | 0.83 | 0.01 | 0.004 | | 0.003 |
| 18 MnCrCTiW | 21.1 | 11.7 | 0.250 | 0.12 | 0.77 | 0.01 | 0.003 | | 0.003 |
| 19 MnCrCTiPB | 20.5 | 11.8 | 0.240 | 0.10 | | 0.01 | 0.034 | 0.005 | 0.034 |
| 20 MnCrCTiVPB | 20.8 | 11.8 | 0.220 | 0.10 | | 0.10 | 0.033 | 0.005 | 0.004 |
| 21 MnCrCTiWVPB | 20.4 | 11.7 | 0.250 | 0.10 | 1.10 | 0.10 | 0.027 | 0.500 | 0.004 |
| 22 MnCrCTiP | 21.0 | 13.8 | 0.140 | | | 0.01 | 0.004 | | 0.002 |
| 23 MnCrCTiPB | 20.9 | 13.6 | 0.110 | 0.09 | 1.28 | 0.02 | 0.004 | 0.001 | 0.003 |
| 24 | 21.0 | 13.6 | 0.190 | 0.11 | 1.27 | 0.10 | 0.028 | 0.006 | 0.003 |
| 25 | 20.9 | 11.9 | 0.075 | | | 0.01 | 0.004 | | 0.002 |
| 26 | 20.8 | 11.7 | 0.096 | 0.11 | 1.25 | 0.02 | 0.004 | 0.001 | 0.002 |
| 27 | 20.9 | 11.6 | 0.078 | 0.11 | 1.26 | 0.10 | 0.037 | 0.006 | 0.003 |
| 28 | 18.8 | 11.7 | 0.240 | 0.33 | 1.98 | 0.01 | 0.003 | 0.001 | 0.008 |
| 29 | 19.2 | 11.7 | 0.240 | 0.34 | 1.94 | 0.01 | 0.044 | 0.008 | 0.006 |
| 30 | 19.6 | 11.8 | 0.250 | 0.09 | 1.96 | 0.01 | 0.043 | 0.008 | 0.014 |
| 31 | 19.0 | 11.8 | 0.250 | 0.09 | 3.15 | 0.01 | 0.041 | 0.008 | 0.008 |

EXAMPLE 1

Figure 2:
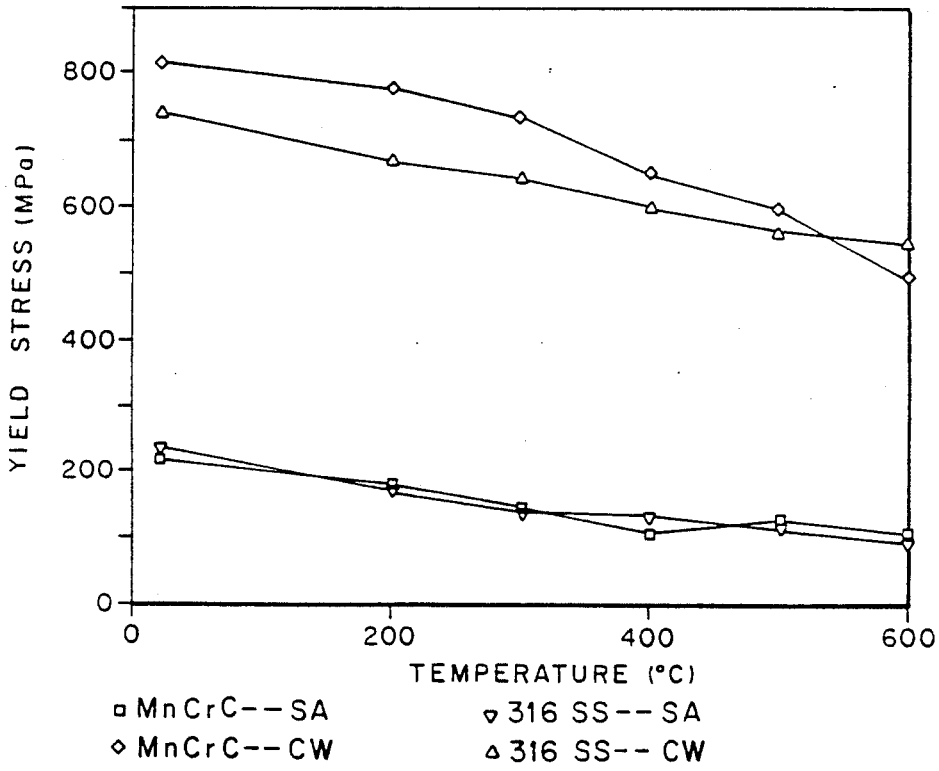
FIG. 2 is a diagram showing the yield stress of a simple manganese-stabilized steel in the solution annealed condition and 20% cold-worked condition as compared with type 316 stainless steel in the same conditions.

A nominally Fe-12Cr-20Mn-0.25C steel was melted, fabricated and tensile tested. FIGS. 2 through 4 compare the tensile properties of this simple steel, labeled MnCrC, in the solution-annealed and 20% cold-worked conditions (common conditions for using such a steel)

with type 316 stainless steel in the same conditions. The yield stress of the manganese-stabilized steel in both conditions is equivalent to that of 316 stainless steel, as shown in FIG. 2. Because of higher work-hardening characteristics imparted by manganese, the high manganese steel achieves a higher ultimate tensile strength for both conditions, as shown in FIG. 3. Despite this higher work hardening capability, the high manganese steel still has equivalent or better ductility than type 316, as measured by total elongation both in solution-annealed and in the cold-worked condition, as shown in FIG. 4. The results indicate that an adequate austenitic base Fe-Cr-Mn-C alloy can be obtained using the information developed in the modified Schaeffler diagram.

EXAMPLE 2

The next objective was to improve the strength of the new alloys by making further minor element additions and combinations to the base composition. This was accomplished by adding Ti, W, V, P and B to the nominally Fe-12Cr-20Mn-0.25C base composition. The alloy combinations that were melted, fabricated and tensile tested are shown as alloys numbered 15 through 21 in Table 2. The lettered alloy designations indicate the alloying elements added to the iron. For example, MnCrCTiW indicates that Mn, Cr, C, Ti and W were added to the iron. In preparing the alloys, the targeted amounts in wt % of the various elements were 12 for Cr, 20 for Mn, 0.25 for C, 0.10 for Ti, 1.0 for W, 0.035 for P and 0.005 for B, although the actual amounts varied slightly in the final compositions, as shown in Table 2. In Table 3, the room temperature tensile properties for seven alloys, including the MnCrC steel, are given along with similar results for a heat of type 316 steel. The steels were tested in two solution-annealed conditions and in the 20% cold-worked condition. The type 316 steel was tested in one of the solution-annealed conditions and in the 20% cold-worked condition.

TABLE 3

| Alloy | Strength, MPa | | Elongation, % | |
|---|---|---|---|---|
| | YS | UTS | Uniform | Total |
| | Solution Annealed 1 h 1050° C. | | | |
| MnCrC | 220 | 798 | 55.4 | 56.6 |
| MnCrCTi | 279 | 927 | 49.7 | 53.0 |
| MnCrCW | 267 | 803 | 57.1 | 59.9 |
| MnCrCTiW | 302 | 918 | 53.8 | 56.9 |
| MnCrCTiPB | 288 | 935 | 52.2 | 55.6 |
| MnCrCTiVPB | 275 | 935 | 51.0 | 53.9 |
| MnCrCTiWVPB | 304 | 915 | 54.9 | 57.5 |
| 316 SS | 236 | 586 | 54.3 | 58.2 |
| | Solution Annealed 2 h 1150° C. | | | |
| MnCrC | 233 | 766 | 53.4 | 55.1 |
| MnCrCTi | 258 | 891 | 53.5 | 56.4 |
| MnCrCW | 247 | 761 | 55.4 | 57.0 |
| MnCrCTiW | 258 | 882 | 54.5 | 57.2 |
| MnCrCTiPB | 271 | 891 | 52.8 | 54.2 |
| MnCrCTiVPB | 221 | 859 | 49.6 | 50.4 |
| MnCrCTiWVPB | 264 | 869 | 59.9 | 61.7 |
| | 20% Cold Worked | | | |
| MnCrC | 815 | 1086 | 14.1 | 16.0 |
| MnCrCTi | 954 | 1160 | 10.7 | 13.0 |
| MnCrCW | 784 | 1057 | 17.6 | 20.0 |
| MnCrCTiW | 980 | 1168 | 6.6 | 9.5 |
| MnCrCTiPB | 946 | 1158 | 10.4 | 12.1 |
| MnCrCTiVPB | 862 | 1126 | 11.4 | 13.1 |
| MnCrCTiWVPB | 915 | 1114 | 11.3 | 13.6 |
| 316 SS | 739 | 807 | 11.5 | 17.4 |

The tensile results given in Table 3 show that for the high manganese steels the strength of the steels solution annealed one hour at 1050° C. generally exceeded those of the same steels annealed two hours at 1150° C. With one exception, after the one hour anneal at 1050° C., the yield stress and especially the ultimate tensile strength of the manganese-stabilized stainless steels exceeded those of the nickel-stabilized type 316 stainless steel. The exception was the yield stress for the base MnCrC steel, which was slightly lower than the yield stress for the type 316 stainless steel. Similarly, the strength measurements of manganese-stabilized steels in the 20% cold-worked conditions exceeded those for the type 316 stainless steel.

In the solution-annealed condition, the ductility as measured by the uniform and total elongations of the manganese-stabilized steels were equivalent to those for 316 stainless steel. Equivalent ductility was also observed for most of the alloys in the cold-worked condition. The only exception was the MnCrCTiW alloy, which had the lowest uniform and total elongations, although these values would still indicate adequate ductility.

Figure 5:
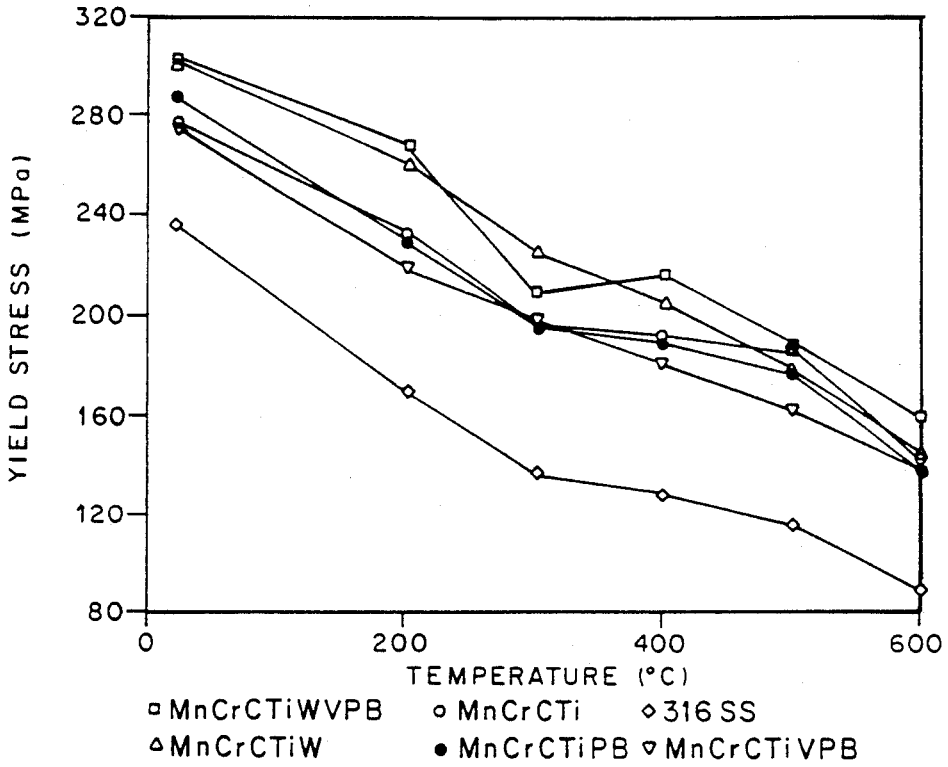
FIG. 5 is a diagram that shows yield stress of five minor solute modified manganese-stabilized steels and the type 316 stainless steel in the solution-annealed condition.
Figure 6:
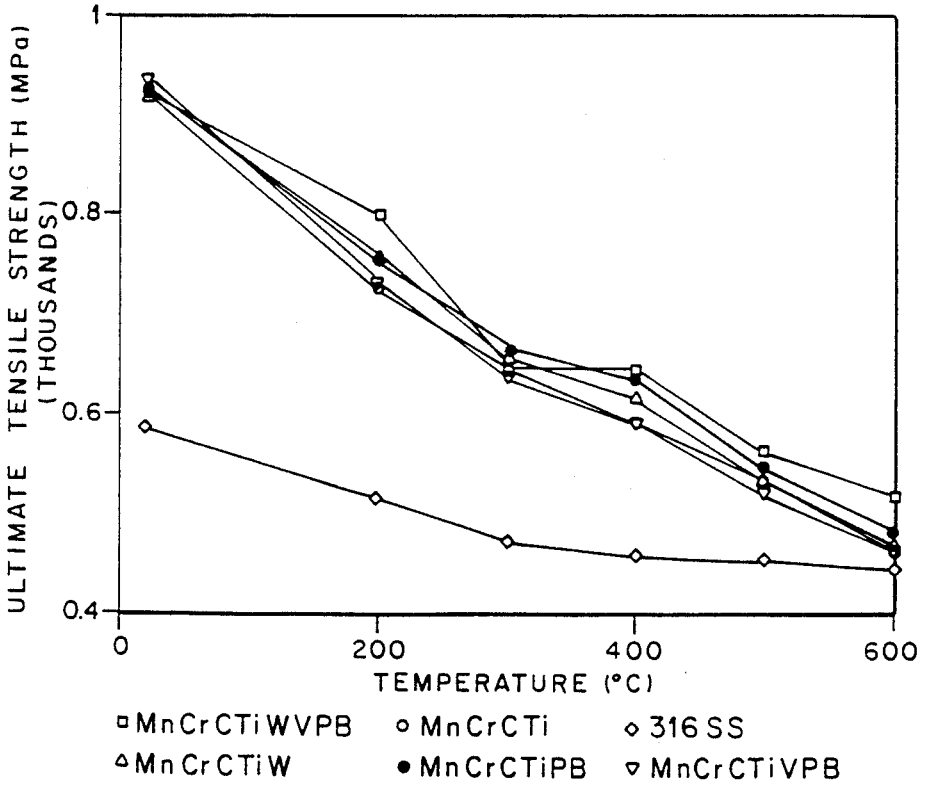
FIG. 6 is a diagram that shows ultimate tensile strength of five minor solute modified manganese-stabilized steels and type 316 stainless steel in the solution-annealed condition.
Figure 7:
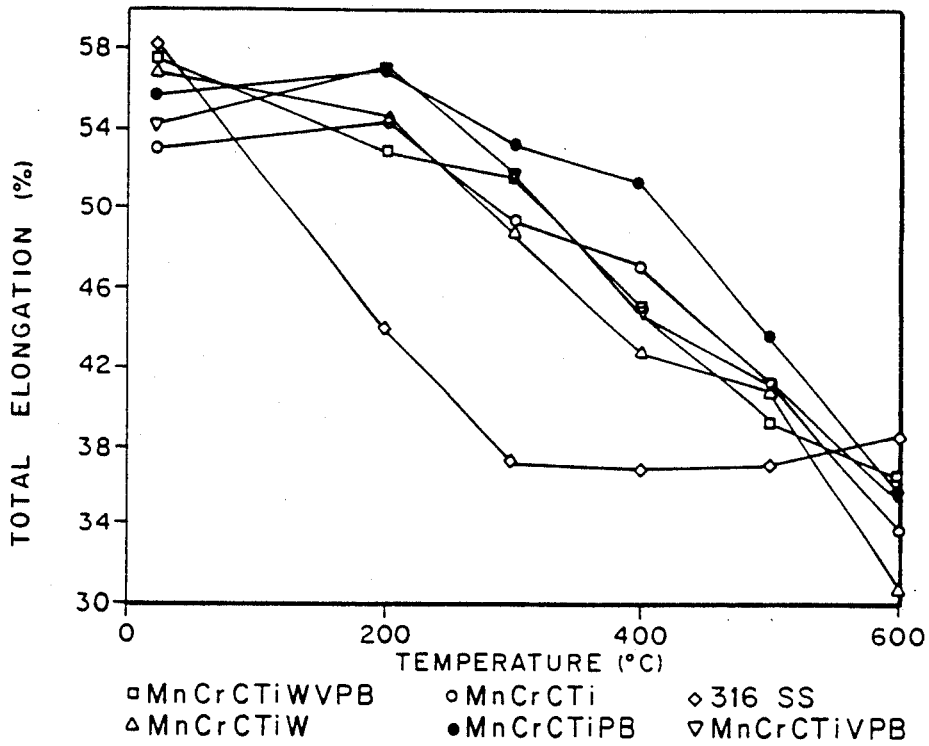
FIG. 7 is a diagram that shows the ductility, in terms of total elongation, of five minor solute modified manganese-stabilized steels and type 316 stainless steel in the solution-annealed condition.
Figure 8:
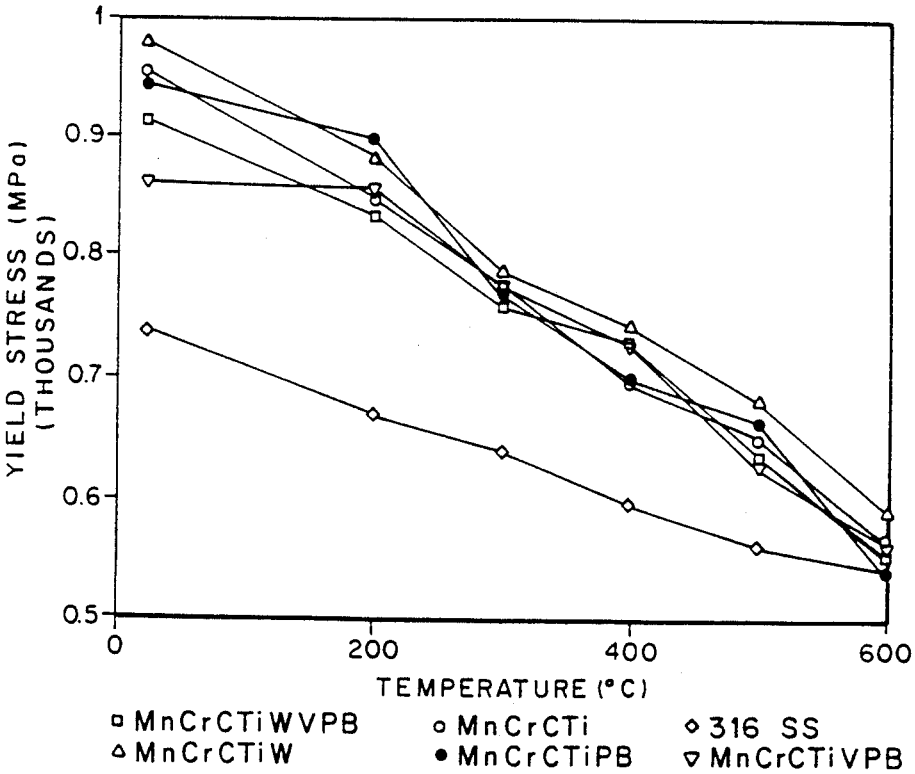
FIG. 8 is a diagram that shows yield stress of five minor solute modified manganese-stabilized steels and type 316 stainless steel in the 20% cold-worked condition.
Figure 9:
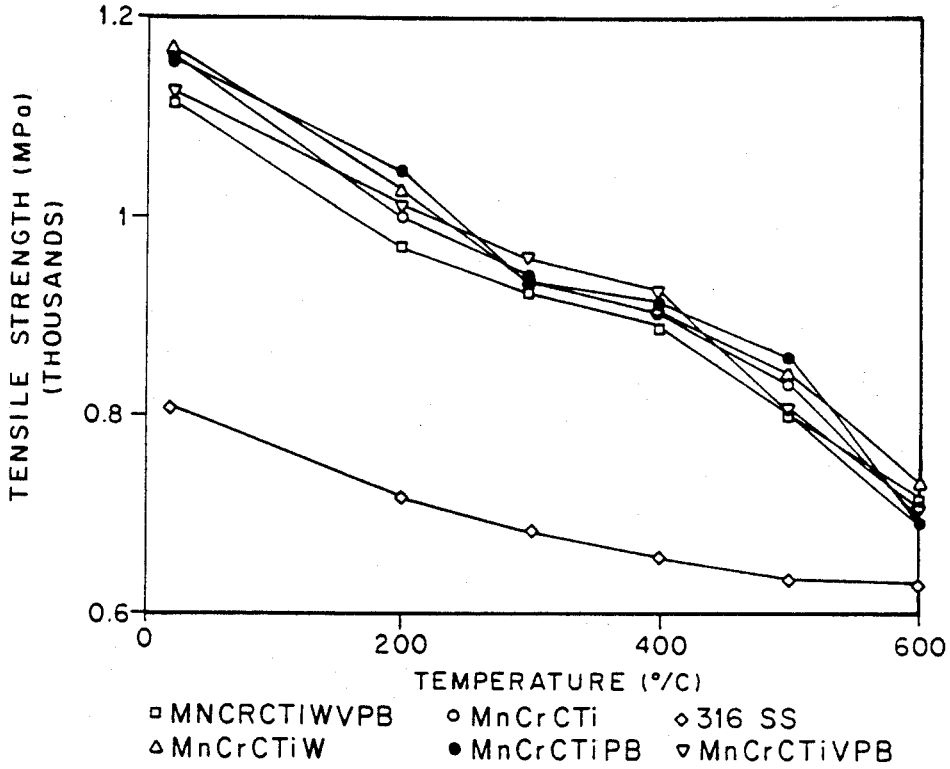
FIG. 9 is a diagram that shows ultimate tensile strength of five minor solute modified manganese-stabilized steels and type 316 stainless steel in the 20% cold-worked condition.
Figure 10:
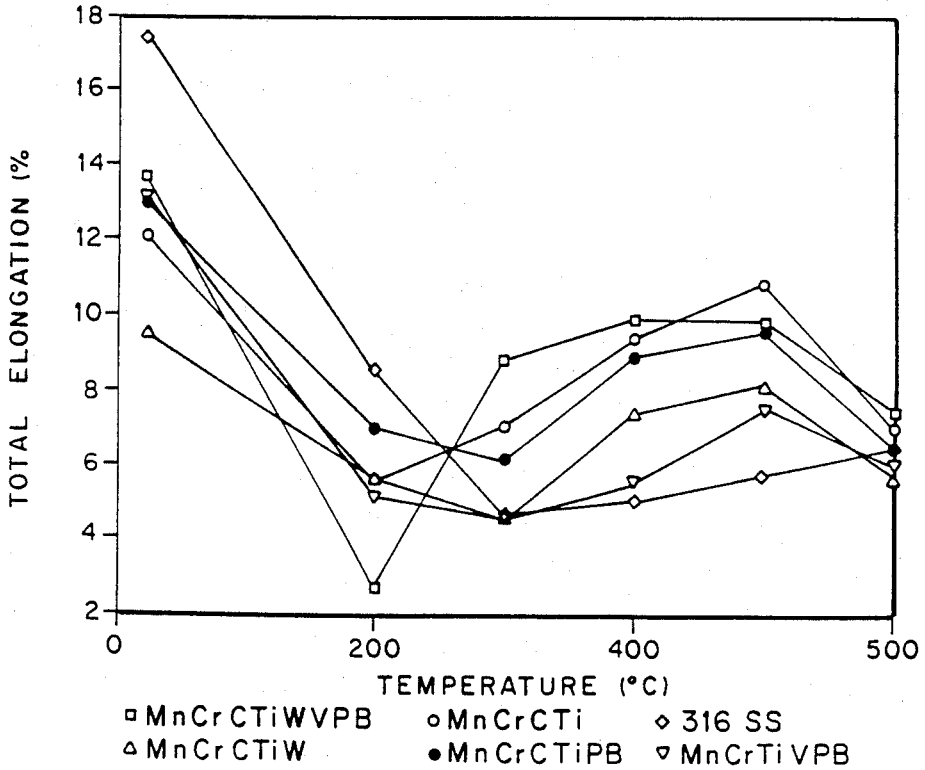
FIG. 10 is a diagram that shows the ductility, in terms of total elongation, of five minor solute modified manganese-stabilized steels and type 316 stainless steel in the 20% cold-worked condition.

A comparison of the room temperature tensile data in Table 3 for manganese-stabilized steels shows the effectiveness of the combination of Ti, W, V, B and P on the strength and ductility of the Fe-Cr-Mn-C base composition. The steels were further tested over the temperature range of room temperature to 600° C. In FIGS. 5–10, the tensile properties for the five strongest steels are compared with those for type 316 stainless steel. The strength results clearly show the superiority of the manganese-stabilized steels in both the solution-annealed conditions, as shown in FIGS. 5 and 6, and the cold-worked condition, as shown in FIGS. 8 and 9. Despite this strength superiority, the ductility is equivalent or better than that for 316 stainless steel in the solution-annealed condition, as shown in FIG. 7. In the cold-worked condition, the 316 stainless steel has a higher total elongation below 200° C., but at higher temperatures, the manganese-stabilized steels have equivalent or better ductility as shown in FIG. 10. These observations on ductility are important because normally strength and ductility are trade-offs. The new steels, therefore, represent a significant gain in strength that does not come at the expense of ductility. These properties give these new steels the potential for non-fusion applications from 20°–600° C. in addition to their application as FIRD steels for fusion.

The results of this work indicate that favorable manganese stabilized stainless steel can be achieved with composition in wt % of 10–18Cr, 20–25Mn, 0.1–0.3C, W, Ti, V, B and P. Also permitted in small amounts is nickel, as well as nitrogen that is unavoidable due to presence in the atmosphere during most commercial processing, without significant harm to strength and ductility. The latter alloys with less stringent compositional limitations would not be used in fusion reactor environments due to the long half-lives of radioactive nitrogen and nickel but would be suitable for other non-fusion uses as a cheaper, stronger substitute for type 316 stainless steels from room temperature to about 600° C.

We claim:

1. A composition of matter of austenitic stainless steel consisting essentially of iron, chromium and a sufficient amount of manganese and carbon to form a face centered cubic austenitic crystalline structure.

2. The composition of claim 1 wherein said composition consists essentially of in wt % 10–18Cr, 20–25Mn, 0.05–0.3C and the balance Fe.

3. The composition of claim 1 further consisting essentially of sufficient titanium in the presence of tungsten or vanadium or combinations thereof, to form small, uniform precipitates for strength and ductility.

4. The composition of claim 3 wherein said composition further consists essentially of in weight % 0.1–0.3 Ti, 1–3 W, 0.1–0.3 V.

5. The composition of claim 3 further consisting essentially of sufficient amounts of boron and phosphorous to support the strengthening effects of said precipitates.

6. The composition of claim 5 wherein said composition further consists essentially of in weight % 0.005–0.01 B and 0.03–0.08 P.

* * * * *